United States Patent [19]

Hashihara et al.

[11] Patent Number: 4,811,411
[45] Date of Patent: Mar. 7, 1989

[54] IMAGE PROCESSING METHOD AND SYSTEM

[75] Inventors: Hideharu Hashihara, Yokohama; Yu Kitayama, Chigasaki, both of Japan

[73] Assignee: International Business Machines Corporation, Armonk, N.Y.

[21] Appl. No.: 28,925

[22] Filed: Mar. 23, 1987

[30] Foreign Application Priority Data

Mar. 25, 1986 [JP] Japan .................................. 61-65031

[51] Int. Cl.$^4$ .............................................. G06K 9/36
[52] U.S. Cl. ...................................... 382/41; 340/723
[58] Field of Search ................ 364/200, 900, 518–522; 340/723, 724, 727, 755; 382/41, 44–49, 57, 61

[56] References Cited

U.S. PATENT DOCUMENTS

| | | | |
|---|---|---|---|
| 4,511,962 | 4/1985 | Machida et al. | 340/724 |
| 4,617,596 | 10/1986 | Yoshida et al. | 382/57 |
| 4,636,783 | 1/1987 | Omachi | 340/723 |
| 4,642,621 | 2/1987 | Nemoto et al. | 340/723 |
| 4,647,971 | 3/1987 | Norman, III | 382/46 |
| 4,700,182 | 10/1987 | Ohgami | 340/723 |
| 4,706,205 | 11/1987 | Akai et al. | 364/518 |
| 4,710,761 | 12/1987 | Kapur et al. | 340/723 |

Primary Examiner—Leo H. Boudreau
Assistant Examiner—Jose L. Couso
Attorney, Agent, or Firm—Terry J. Ilardi

[57] ABSTRACT

An image processing method and system wherein the virtual storage concept is introduced into the storage and management of image data so as to be adapted to an image processing. Data representing an image is stored on a block basis as data blocks corresponding to image strips in a virtual image, in a first storage device, having a plurality of storage blocks, corresponding to a virtual storage, and the data blocks to be processed are fetched from the first storage device into a second working storage device, having a smaller number of storage blocks than the plurality of storage blocks in the first storage device, corresponding to real storage, to perform image processing.

11 Claims, 6 Drawing Sheets

IMAGE PROCESSING METHOD AND SYSTEM

BACKGROUND OF THE INVENTION

1. Field of the Invention

The present invention relates to an image processing method and apparatus and, more particularly, to an image processing method and apparatus in which the virtual storage concept is used for the storage and management of image data to perform image processing.

2. Description of the Prior Art

Generally, in image processing, image data displayed with pixels, such as characters, patterns, etc., are processed. Therefore, image processing ordinarily must handle an enormous amount of data, and accordingly, it is quite time consuming.

Japanese Patent Unexamined Published Application No. 59-212,971 discloses an image data generator wherein the processing time for generating image data may be reduced by reusing image data which has been generated and retained as much as possible in an external storage. This application also discloses that if the capacity of external storage would be exceeded when newly generated image data is stored in it, the newly generated image data could be stored in external storage by removing image data already stored in external storage in an ascending order of frequency of use.

Japanese Patent Unexamined Published Application No. 58-4,470 discloses that only necessary portions of image data in a memory are fetched sequentially from the top into a buffer or a CPU in the form of blocks.

In processing image data with a data processing system having a small storage capacity, for example, a personal computer, the size of an image processing program used is limited because of the enormous amount of image data. The restriction would be removed by storing and retaining the image data in external storage.

However, in such a system as disclosed in the above Application No. 59-212,971, the efficiency in handling the image data and, therefore, the performance of the image processing is reduced, since the time required to transfer the image data to and from external storage occupies most of the image processing time. It is therefore necessary to reduce this time.

Accordingly, as disclosed in the above mentioned Application No. 58-4,470, attempts have been made to reduce the time required to transfer image data by transferring the image data in the form of blocks. However, in that system, the data blocks are fetched only sequentially from the top, and such a procedure could not be adapted to complex image processing, such as COPY and ROTATE processing. Therefore, the performance of complex image processing must be reduced, otherwise it becomes infeasible.

It is thus an object of the present invention to provide an image processing method and system wherein the virtual storage concept is introduced into the storage and management of image data so as to be adapted to an image processing.

In accordance with the present invention, an image processing method and system, wherein the storage and management of image data have been improved is provided. Accordingly, the present invention can substantially improve the performance of image processing compared with conventional image processing methods and systems.

These and other objects, advantages and features of the invention will be more apparent upon reference to the following specification and the annexed drawings.

SUMMARY OF THE INVENTION

In accordance with an illustrative embodiment demonstrating objects and features of the present invention, there is provided an image processing method and apparatus in which data representing an image is stored on a block basis as data blocks in a first storage device having a plurality of storage blocks. The data blocks to be processed are fetched from the first storage device into a second working storage device having a smaller number of storage blocks than the first storage device, to perform image processing.

DESCRIPTION OF THE PREFERRED EMBODIMENTS

Figure 1:
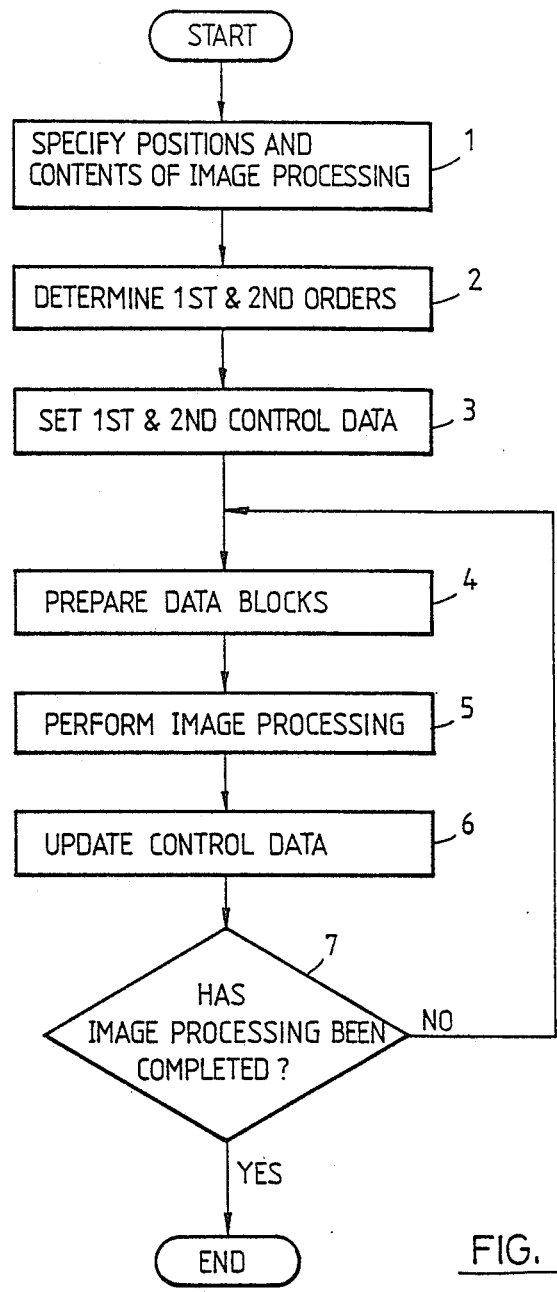
FIGS. 1 and 2 show flow charts for explaining the method according to the present invention.

In the image processing method according to the present invention, as shown in FIG. 1 illustrating the flow chart, first in Step 1, the position of a specified area in the image, the contents of the image processing to be performed on the specified area, and the position of a destination area in the image which is a destination of the specified area in the image processing are specified.

Then, in Step 2, the data blocks associated with the specified and destination areas are found, and in accordance with the contents of the image processing, a first order in which the data blocks associated with the specified area are used in the image processing and a second order in which the data blocks associated with the destination area are used in the image processing are determined.

In Step 3, first control data including data representing the association with the specified area and data representing the first order is set in those entries in a table which correspond to the storage blocks in the first or second storage device storing the data blocks associated with the specified area, and second control data including data representing the association with the destination area and data representing the second order is set in those entries in the table which correspond to the storage blocks in the first or second storage device storing the data blocks associated with the destination area, the table having entries each corresponding to each of the storage blocks in the first and second storage device.

Figure 2:
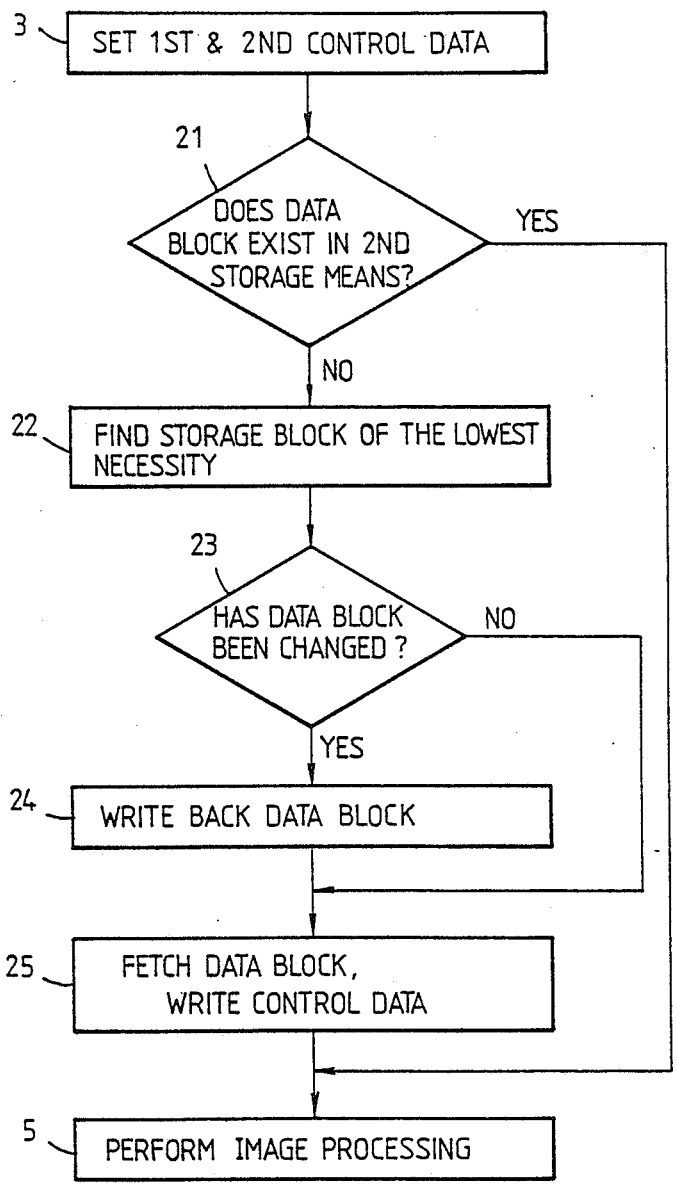

Next, in Step 4, the data blocks associated with the specified and destination areas are prepared in the second storage device, with the necessity in the second storage device of the contents stored in each of the storage blocks in the second storage device being checked based on the contents of the entries in the table each corresponding to each of the storage blocks in the second storage device. Particularly, the data blocks are prepared in the following manner, as shown in FIG. 2 illustrating the flow chart. Namely, in Step 21, it is checked whether or not a data block to be used exists in the second storage device. If the data block to be used exists therein, it is used to perform the image processing. If not, proceeding to Step 22, a storage block which is the lowest in the necessity indicated by the control data is found. In this step, when the data block is to be used in association with the specified area, the storage block of the lowest necessity in association with the specified area is found, and when the data block is to be used in association with the destination area, the storage block of the lowest necessity in association with the destination area is found. Then, in Step 23, it is checked whether or not the data block existing in the storage block of the lowest necessity has been changed. If not, the data block need not be retained. Thus, proceeding to Step 25, the data block to be used is fetched from the first storage device into the storage block of the lowest necessity, and at the same time, the control data for the data block to be used is written into the entry in the table corresponding to the storage block of the lowest necessity. If the data block existing in the storage block of the lowest necessity has been changed, the data block need be retained. Thus, proceeding to Step 24, the data block is written back into the first storage device, and then proceeding to Step 25, the fetching of the data block to be used and the writing of the control data for the data block to be used are performed.

Then, in Step 5 following Step 4, the data blocks prepared in the second storage device are used to perform the image processing.

Next, in Step 6, the control data for the data blocks used in performing the image processing are updated. Particularly, in this step, when the data blocks have been used in association with the specified area in the image processing, the control data are updated in association with the specified area, and when the data blocks have been used in association with the destination area in the image processing, the control data are updated in association with the destination area.

In step 7, it is checked whether or not the image processing has been completed. Said image processing is completed when it is performed as to all the data blocks associated with the specified and destination areas. Until it is completed, the Steps 4 through 6 are repeated. When the image processing has been completed, the image processing method according to the present invention has been completed.

Figure 3:
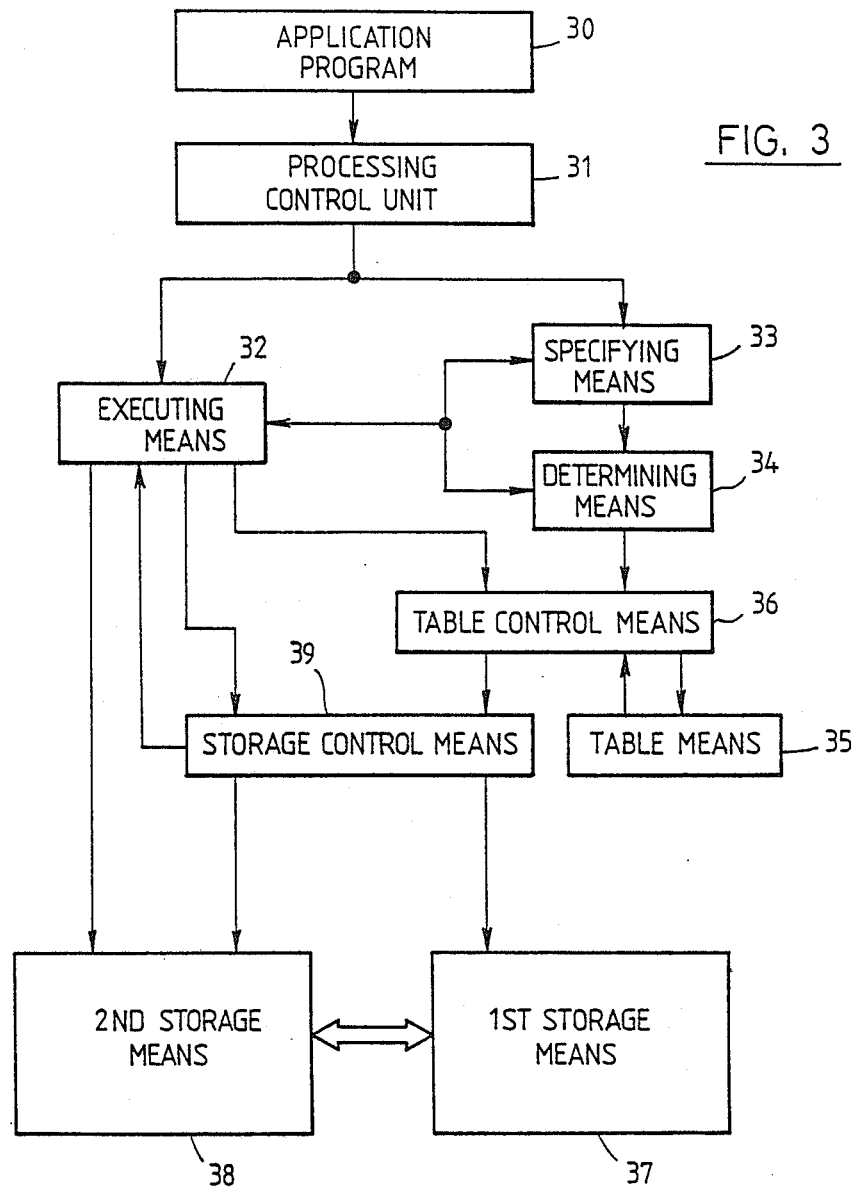
FIGS. 3 and 4 show functional block diagrams for explaining the system according to the present invention.

Next, the image processing system according to the present invention will be described. As shown in FIG. 3, the image processing system comprises a specifying device 33, a determining device 34, a table 35, a table control device 36, a first storage device 37, a second storage device 38, and a storage control device 39. An application program 30, a process control unit 31, and an executing device 32 are available in an ordinary computer.

The first storage device 37 stores data representing an image on a block basis as data blocks, into a plurality of storage blocks thereof.

The second storage device 38, having a smaller number of storage blocks than the plurality of storage blocks in the first storage device 37, stores the data blocks to be processed into the storage blocks. The data blocks stored in the second storage device 38 are used in the image processing.

The specifying device 33 specifies the position of a specified area in the image, the contents of the image processing to be performed on the specified area, and the position of a destination area in the image which is a destination of the specified area in the image processing.

The determining device 34 finds the data blocks associated with the specified and destination areas and determines orders in which the data blocks ar used in the image processing, in accordance with the contents specified by the specifying device 33.

The table 35 has entries each corresponding to each of the storage blocks in the first and second storage device 37 and 38.

Figure 4:
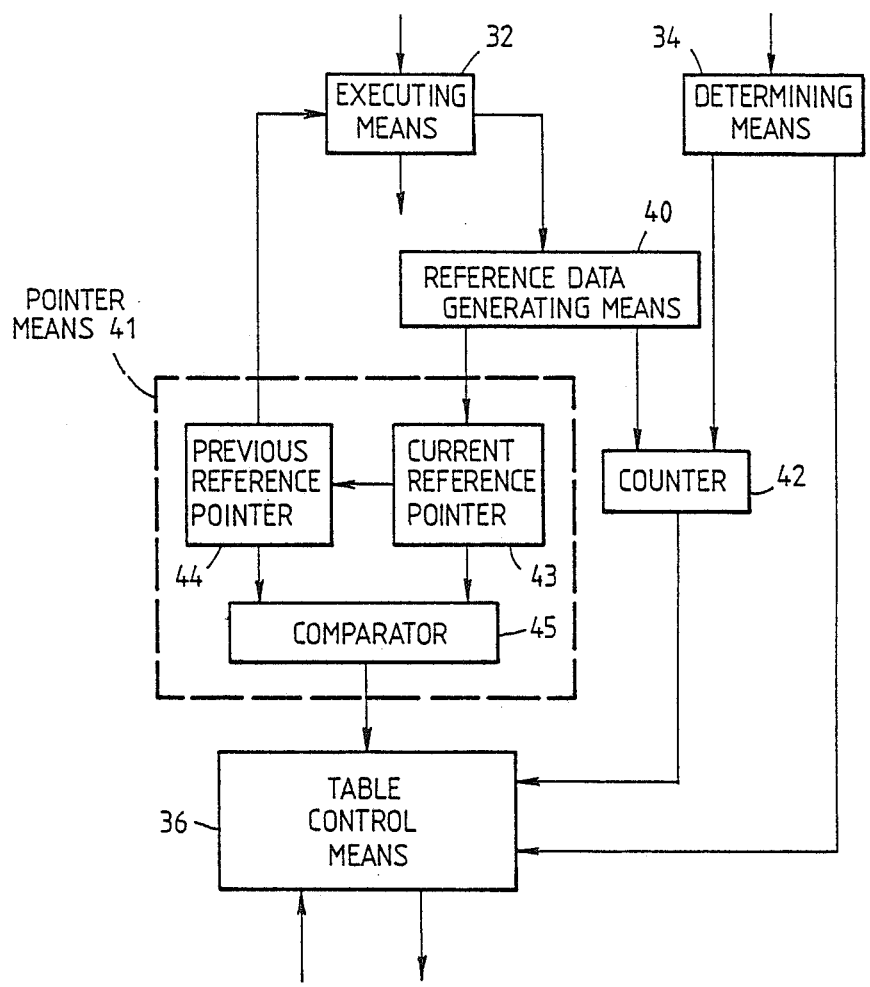

The table control device 36, connected between the determining device 34 and the table 35, sets control data in the entries in the table 35, updates the control data in the entries in the table each corresponding to each of the storage blocks in the second storage device 38, and checks the contents of the entries each corresponding to each of the storage blocks in the second storage device. Particularly, as shown in FIG. 4, the table control device 36 is provided with a reference data generating device 40, which generates data concerning associated data blocks from the position data of reference points in the image, and a pointer device 41, which receives outputs of the reference data generating device 40 and indicates the data blocks to be referenced, thereby facilitating the management of the data blocks by the table control device 36. A counter 42 is provided to count the number of data blocks. Further, the pointer device 41 comprises a current reference pointer 43, which indicates the data blocks referenced currently, a previous reference pointer 44, which indicates the data blocks referenced previously, and a comparator 45, which compares the contents of the current reference pointer 43 and those of the previous reference pointer 44 and outputs the contents of one of the pointers, thereby enabling to indicate properly the data blocks to be referenced in performing the image processing.

The storage control device 39 receives outputs of the table control device 36 and controls the first and second storage device 37 and 38. Particularly, the storage control device 39 controls the writing and reading of data into and out of the first and second storage device 37 and 38 on a block basis, and receives the outputs of the table control device 36 to cause the data blocks to be written from the first storage device 37 into the second storage device 38. Further, the storage control device 39 generates real addresses of the data in the first and second storage device 37 and 38.

An illustrative embodiment is now further described in detail.

Figure 5:
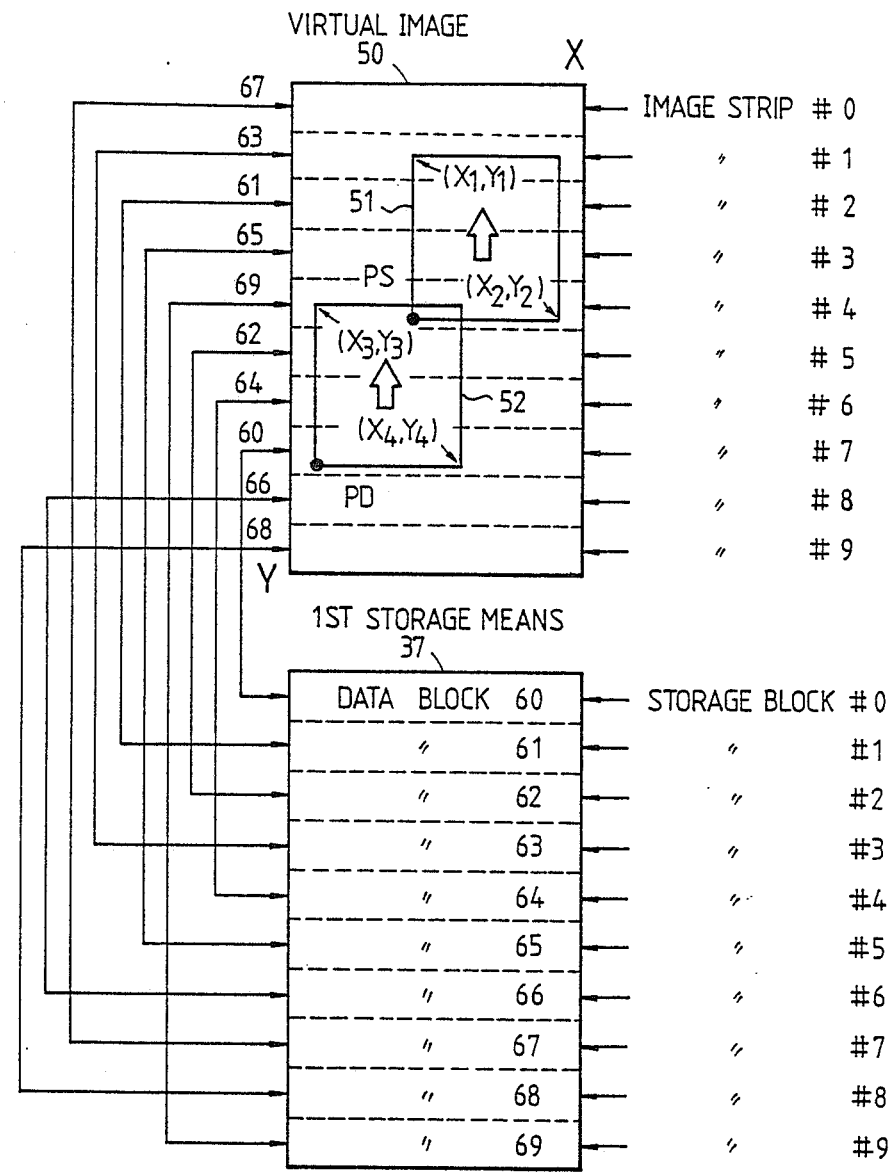
FIGS. 5 and 6 show block diagrams for explaining an embodiment of the present invention.

The application program 30 shown in FIG. 3 performs, for example, a MOVE processing, wherein a specified area or the whole area of an image of a certain size, e.g. an image of one page, is moved into another area on the same page with the original area erased; a COPY processing, wherein a specified area is copied into another area with the specified area retained; an ERASE processing, wherein a specified area is erased; and a ROTATE processing, wherein a specified area is rotated and moved into another area. The specified area and another area may be overlapped with each other or separated from each other. Said image of one page is hereinafter referred to as a virtual image and shown in FIG. 5 with the reference number 50. The virtual image 50 consists of a plurality of image strips #0–#9, as shown in FIG. 5. Said specified area is hereinafter referred to as a source area and the another area is hereinafter referred to as a destination area, and they are shown in FIG. 5 with the reference numbers 51 and 52, respectively. The image data of the virtual image 50 has been stored in storage blocks #0–#9 of the first storage device 37, such as an external storage, as data blocks 60–69.

The writing and reading of image data into and out of the first storage device 37 are performed on a block basis. Therefore, as shown in FIG. 5, the virtual image 50 is divided into the image strips. Although the virtual image 50 may be stored into the storage blocks of the first storage device 37 sequentially from the top, the virtual image 50 is generally stored therein in any sequence as shown in FIG. 5, since the first storage device 37 can be accessed on a block basis as stated above. To assemble the virtual image 50 sequentially from the top, the data blocks in the first storage device 37 would be accessed in the sequence of the data blocks 67, 63, 61, . . . , 66, and 68.

Now, the operations of the present invention will be explained below as for the case where the application program 30 selects a COPY processing wherein the image in the source area 51 in the virtual image 50 is copied into the destination area 52, as shown in FIG. 5.

The application program 30 supplies commands and data to the processing control unit 31. The processing control unit 31 supplies the output to the specifying device 33, and the specifying device 33 specifies the positions of reference areas in the virtual image 50, namely the source area 51 and the destination area 52, and the contents of the image processing, namely the COPY processing. The reference areas, if they are rectangular areas, are specified with the X - Y coordinates of the upper left corners and the down right corners thereof, for example (Xi , Yi) through (X4 , Y4), as shown in FIG. 5. With the COPY processing specified, the executing device 32 selects the COPY processing algorithm.

Upon receipt of the output of the specifying device 33, the determining device 34 finds the data blocks 63, 61, 65, 69, 62, 64, and 60 associated with the source area 51 and the destination area 52, and determines the orders in which the data blocks are used in the COPY processing, namely the referencing directions, as shown with big arrows in FIG. 5. The referencing directions are important in a case where the source and destination areas are overlapped with each other, as shown in FIG. 5. If the image in the source area is copied into the destination area from top to bottom in the direction opposite to the referencing directions shown in FIG. 5, the image in the portion of the source area overlapping with the destination area would be destroyed. Therefore, the image in the source area should be copied into the destination area from bottom to top.

FIG. 5 also illustrates the correspondence between the virtual image 50 and the first storage device 37. When the virtual image 50 is set as a document of one page, as stated before, for example, the first storage device 37 stores the data blocks corresponding to the image strips, which are the partial images of the document, in a random sequence.

Upon receipt of the output of the determining device 34, the table control device 36 sets control data reflecting the referencing directions in those entries in the table 35 which correspond to the storage blocks in the first storage device 37 or the second storage device 38 storing the data blocks associated with the source and destination areas 51 and 52. The table control device 36 is used especially to determine the storage blocks of the second storage device 38 wherein data blocks fetched from the first storage device 37 are to be stored.

Figure 6:
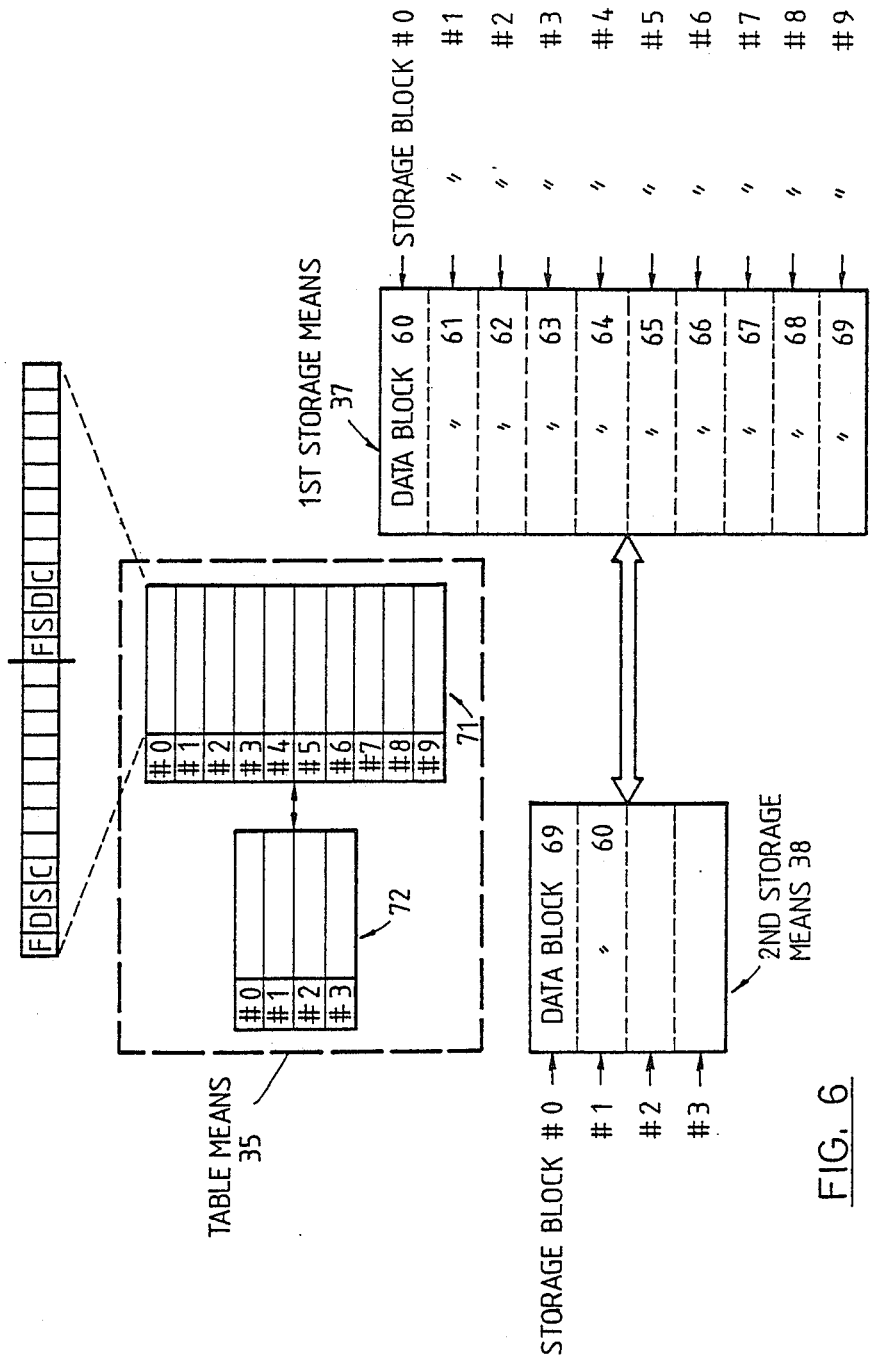

FIG. 6 illustrates the table 35 together with the first and second storage device 37 and 38. The table 35 consists of a table 71 for the first storage device 37 and a table 72 for the second storage device 38.

The table 71 has ten entries #0–#9, for example. Each of the entries corresponds to each of the ten storage blocks #0–#9 of the first storage device 37, and can store the control data for the data block stored in the corresponding storage block.

The table 72 has four entries, for example. Each of the entries corresponds to each of the four storage blocks #0–#3 of the second storage device 38, and stores the control data which represents the control value of the data block existing in the corresponding storage block.

Each of the entries of the tables 71 and 72 stores the control data consisting of 24 bits, for example. When a data block has been fetched from the first storage device 37 into the second storage device 38, the control data for the data block is transferred from the entry of the table 71 storing the control data into the entry of the table 72 corresponding to the storage block in the second storage device 38 into which the data block has been fetched.

FIG. 6 also illustrates a format of the control data consisting of 24 bits. The control data consists of two parts. Namely, 12 bits on the left side are the control data for the corresponding data block when used in association with the source area, and 12 bits on the right side are the control data for the corresponding data block when used in association with the destination area. Accordingly, in this case, the 12 bits on the left side constitute the control data for the source area, namely the source control data, and the 12 bits on the right side constitute the control data for the destination area, namely the destination control data. The 12 bits on the left side and the 12 bits on the right side may be defined vise versa. Namely, the 12 bits on the left side and the 12 bits on the right side may also be used for the destination area and the source area, respectively.

The contents of the source and destination control data will be described below.

At each of the most significant 0 bit positions of the control data for both areas, a FIX flag bit F is provided. Both of the FIX flag bits F are set or reset simultaneously. The FIX flag bits F are used when the corresponding data block is retained in the second storage device 38 to be used repeatedly. For that purpose, the FIX flag bits F are set to 1. As the result, the maximum control value, namely bit value, is obtained. Especially, in case of a ROTATE processing such as a rotation of 90° or 270°, there may exist data blocks which would be referenced frequently. In such a case, according to the ROTATE processing algorithm, the data blocks to be referenced are specified and, when the data blocks are desired to be fixedly stored in the second storage device 38, the FIX flag bits F are set to 1, and when they are desired to be released, the FIX flag bits F associated with the data blocks are reset to 0. Thus, by controlling the fetching of the data blocks with the FIX flag bits F, the frequency of fetching may be reduced, thereby increasing the performance of the image processing.

The 1, 2, and 3 bit positions of the source control data represent a DESTINATION flag bit D, a SOURCE flag bit S, and a CHANGE flag bit C, respectively, while the 1, 2, and 3 bit positions of the destination control data represent a SOURCE flag bit S, a DESTI- NATION flag bit D, and a CHANGE flag bit C, respectively. The same type of flag bits provided in the respective source and destination control data are set or reset simultaneously. If a data block stores the image of the source area in the virtual image, both of the SOURCE flag bits S in the control data for the the data block are set to 1. If a data block acts as a destination area in the virtual image, both of the DESTINATION flag bits D in the control data for the data block are set to 1. Further, when the image, namely the storage data, in the data block has been changed while in the second storage device 38, both of the CHANGE flag bits C in the control data for the data block are set to 1. Accordingly, when the CHANGE flag bits C are set to 1, the data block is written back into the first storage device 37, since the contents have been changed.

The remaining 8 bits, namely the 4 through 11 bit positions, of the respective source and destination control data are priority specifying bits for both of the source and destination areas which represent the priority of the data block.

As stated before, the determining device 34 finds the data blocks associated with the reference areas in accordance with the contents specified by the specifying device 33, and the table control device 36 sets predetermined values as the control data from the FIX flag bit F through the CHANGE flag bit C into the corresponding entries in the table 35. Further, the table control device 36 sets priorities sequentially from the highest value as the control data into the priority specifying bits in the control data according to the referencing direction. Thus, the control data from the FIX flag bit F through the priority specifying bits represent the necessity of the data block.

The control data is updated after the data block has been used in the image processing.

In the source control data, the DESTINATION flag bit D is located at a more significant position than the SOURCE flag bit S for the following reason. Namely, when the data block is used in association with the source area and later used in association with the destination area in the second storage device 38, the data block is thereby caused to be left in the second storage device 38 after it has been used therein in association with the source area, in order to reduce the frequency of fetching. In that case, the source control data is updated; i.e., the SOURCE flag bit S and the priority specifying bits are reset in the source control data, because the DESTINATION flag bit D, located at a more significant position than the SOURCE flag bit and the priority specifying bits, has been set to 1 and, therefore, control data of a larger control value, namely bit value, exists in the source control data. (It is premised that the data blocks are erased from the second storage device 38 in an ascending order of control values.)

It is for the same reason that, in the destination control data, the SOURCE flag bit S is located at a more significant position than the DESTINATION flag bit D.

In each of the source and destination control data, the CHANGE flag bit C is located at a less significant position than any of the FIX flag bit F, the SOURCE flag bit S, and the DESTINATION flag bit D. This is because the CHANGE flag bit C, which only indicates whether the data stored in the data block has been changed or not, would not thereby substantially decide the amount of the control value, namely bit value. If the CHANGE flag bit C were defined otherwise, the data block would be judged to have a larger control value and left in the second storage device 38, although the CHANGE flat bit C had been set to 1 in order to indicate only that the data stored in the data block had been changed. This would prevent the effective use of the storage device.

Next, an explanation will be made as to how the COPY processing, wherein the source area 51 in the virtual image 50 shown in FIG. 5 is copied to the destination area 52, is performed.

At the beginning, it is assumed that all the entries of the tables 71 and 72 and all the storage blocks of the second storage device 38 have been cleared.

The application program 30 causes the specifying device 33 to specify the COPY processing and also the coordinate data of the upper left and down right corners (X1 , Y1) and (X2 , Y2) of the source area 51 in the virtual image 50 and the coordinate data of the upper left and down right corners (X3, Y3) and (X4 , Y4) of the destination area 52.

In response to the specification of the COPY processing by the specifying device 33, the determining device 34 causes the executing device 32 to select the COPY processing algorithm out of already stored algorithms such as the MOVE, COPY, ERASE, ROTATE and other processing algorithms.

Based on the given coordinate data, the determining device 34 recognizes that the bottom portion of the source area 51 and the top portion of the destination area 52 are overlapped with each other, and determines that the processing of the source areas 51 and the destination area 52 should be performed in the bottom to top direction.

Further, based on the coordinate data (X1 , Y1) and (X2 , Y2) of the source area 51, the determining device 34 finds in which data blocks the image of the source area 51 is stored. Since the image of the source area 51 is stored as the data blocks 63, 61, 65, and 69 into the storage blocks #3, #1, #5, and #9 of the first storage device 37, as shown in FIG. 5, it is necessary to read these data blocks out of the first storage device 37. The direction of the processing is the order of the data blocks 69, 65, 61, and 63, as shown with a big arrow in FIG. 5, such an order called the priority. Then, the table control device 36 sets the source control data for these four data blocks into the entries #9, #5, #1, and #3 of the table 71 corresponding to the four data blocks as stated below. (Now, it is assumed that no data block has been stored in the second storage device 38. However, if any of the data blocks 69, 65, 61, and 63 exists in the second storage device 38 as by a preceding image processing, the control data for the data block would be set in the corresponding entry of the table 72 by the table control device 36.)

As shown in the following Table 1, the SOURCE flag bit S in the source control data in each of the entries #9, #5, #1, and #3 of the table 71 is set to 1. At this time, the SOURCE flag bit S in the destination control data in each of the entries is also set to 1. Further, the priority is set in the priority specifying bits in the source control data, as shown in Table 1.

The determining device 34 determines the direction of the processing based on the coordinate data (X3 , Y3) and (X4 , Y4) of the destination area 52, and finds in which storage blocks and as which data blocks the image of the destination area 52 is stored based on the coordinate data of the destination area 52. Since the image of the destination area 52 is stored as the data blocks 69, 62, 64, and 60 into the storage blocks #9, #2, #4, and #10 in the first storage device 37 as shown in FIG. 5, it is necessary to read these data blocks out of the first storage device 37. The determined direction of the processing is the order of the data blocks 60, 64, 62, and 69, which is the priority, as shown by the big arrow in FIG. 5.

The table control device 36 sets the destination control data for these four data blocks into the entries #0, #4, #2, and #9 of the table 71 corresponding to the four data blocks as stated below.

The DESTINATION flag bit D in the destination control data in each of the entries #0, #4, #2, and #9 of the table 21 is set to 1. At this time, the DESTINATION flag bit D in the source control data in each of the entries is also set to 1.

Further, the priority is set in the priority specifying bits in the destination control data, as shown in Table 1.

TABLE 1

Control Data Set in Table 71

| [Entry] | [Source Control Data] | | | | Priority Specifying Bits (8 bits) | [Destination Control Data] | | | | Priority Specifying Bits (8 bits) |
|---|---|---|---|---|---|---|---|---|---|---|
| | F | D | S | C | XXXXXXXX | F | S | D | C | XXXXXXXX |
| #0 | 0 | 1 | 0 | 0 | X' 00' | 0 | 0 | 1 | 0 | X' FF' |
| #1 | 0 | 0 | 1 | 0 | X' FD' | 0 | 1 | 0 | 0 | X' 00' |
| #2 | 0 | 1 | 0 | 0 | X' 00' | 0 | 0 | 1 | 0 | X' FD' |
| #3 | 0 | 0 | 1 | 0 | X' FC' | 0 | 1 | 0 | 0 | X' 00' |
| #4 | 0 | 1 | 0 | 0 | X' 00' | 0 | 0 | 1 | 0 | X' FE' |
| #5 | 0 | 0 | 1 | 0 | X' FE' | 0 | 1 | 0 | 0 | X' 00' |
| #6 | 0 | 0 | 0 | 0 | X' 00' | 0 | 0 | 0 | 0 | X' 00' |
| #7 | 0 | 0 | 0 | 0 | X' 00' | 0 | 0 | 0 | 0 | X' 00' |
| #8 | 0 | 0 | 0 | 0 | X' 00' | 0 | 0 | 0 | 0 | X' 00' |
| #9 | 0 | 1 | 1 | 0 | X' FF' | 0 | 1 | 1 | 0 | X' FC' |

F=FIX Flag Bit
D=DESTINATION Flag Bit
S=SOURCE Flag Bit
C=CHANGE Flag Bit

F=FIX Flag Bit
S=SOURCE Flag Bit
D=DESTINATION Flag Bit
C=CHANGE Flag Bit

As shown in Table 1, in the control data in the entry #9 of the table 21 corresponding to the data block 69 which is associated with both of the source area 51 and the destination area 52, both of the SOURCE flag bit S and the DESTINATION flag bit D in both of the source control data and the destination control data have been set to 1.

The executing device 32 requests the storage control device 39 to provide thereto the real address RPS in the data block 69 corresponding to the starting point PS of the bottom line of the source area 51.

The storage control device 39 provides the real address RPS to the COPY processing algorithm.

The executing device 32 selects one data block to be processed in the source area 51, namely the data block 69 including the starting point PS in this case.

All the data in the data block 69 is transferred into a vacant storage block or a storage block including an already used data block in the second storage device 38. At this time, assuming that all of the storage blocks #0, #1, #2, and #3 have not stored any data block, all the data in the data block 69 is transferred into the storage block #0.

The source control data and the destination control data, consisting of 24 bits, in the entry #9 of the table 71 are transferred into the entry #0 of the table 72.

Thus, the data block 69 storing the bottom portion of the source area 51 shown in FIG. 5 has been transferred into the storage block #0 in the second storage device 38, and the control data, consisting of 24 bits, for the data block 69 has been transferred into the entry #0 of the table 72.

Next, an explanation will be made as to the operation of transferring the data block 60, which stores the bottom portion of the destination area 52 to which the bottom portion of the source area 51 is to be copied, from the first storage device 37 into the second storage device 38.

This operation is performed in the same manner as that described above as to the data block 69.

The executing device 32 requests the storage control device 39 to provide thereto the real address RPD in the data block 60 corresponding to the starting point PD of the bottom line of the destination area 52.

The storage control device 39 provides the real address RPD to the COPY processing algorithm.

The executing device 32 selects one data block to be processed in the destination area 52, namely the data block 60 including the starting point PD in this case.

The storage control device 39 transfers all the data in the data block 60 into a vacant storage block in the second storage device 38. Since the storage block #0 has been stored with the data in the data block 69, all the data in the data block 60 is stored into the next storage block #1.

The source control data and the destination control data, consisting of 24 bits, for the data block 60, existing in the entry #0 of the table 71, are transferred into the entry #1 of the table 72 corresponding to the storage block #1 in the second storage device 38.

At this time, all the data in the data blocks 69 and 60 have been transferred into the storage blocks #0 and #1 in the second storage device 38. Then, the COPY processing algorithm directly accesses the storage blocks #0 and #1 in the second storage device 38 to perform the COPY processing.

The COPY processing algorithm calculates the lateral lengths of the source and destination areas based on the coordinate data (X1, Y1), (X2, Y2), (X3 Y3), and (X4, Y4). Also, the COPY processing algorithm is provided with the real addresses RPS and RPD by the storage control device 39 in the above stated operation. Based on these real addresses and the lateral lengths, the COPY processing algorithm accesses the second storage device 38 directly and writes the image in the bottom line of the source area into the bottom line of the destination area.

The COPY processing algorithm requests the storage control device 39 to provide thereto two real addresses which indicate the starting points of the next data lines in the source and destination areas.

The storage control device 39 provides the COPY processing algorithm with the two real addresses.

Based on the two real addresses, the COPY processing algorithm accesses the second storage device directly and writes the image in the next data line of the source area into the next data line of the destination area.

The operations from the requesting of the real addresses to the writing of the image data are repeated. During these operations, the executing device 32 checks whether or not the COPY processing operations have reached the top data line in the data block 69 of the source area. If so, the executing device 32 does not perform the writing operation, and the table control device 36 resets the SOURCE flag bit S in each of the source control data and the destination control data in the entry #0 of the table 72 from 1 to 0 and resets the priority of the source control data to 0. Also, the executing device 32 checks whether or not the COPY processing operations have reached the top data line in the data block 60 of the destination area. If so, the executing device 32 does not perform the writing operation, and the table control device 36 resets the DESTINATION flag bit D in each of the source control data and the destination control data in the entry #1 of the table 72 from 1 to 0 and resets the priority of the destination control data to 0.

block to be processed in the source area, and as stated before, the storage control device 39 stores the data block 65 into a vacant storage block, namely the storage block #2, in the second storage device 38. Further, the table control device 36 transfers the control data for the data block 65 (Table 1) from the table 71 into the entry #2 of the table 72.

Next, the executing device 32 selects the data block 64 as a data block to be processed in the destination area, and the storage control device 39 stores the data block 64 into a vacant storage block, namely the storage block #3, in the second storage device 38. Then, the control data for the data block 64 is transferred from the table 71 into the table 72.

Then, as in the case of the data blocks 69 and 60 stated before, in the second storage device 38, the portion of the source area in the data block 65 is copied into the portion of the destination area in the data block 64. When the copying has been finished, the table control device 36 resets the SOURCE flag bit in the control data for the data block 65 from 0 to 1 and resets the priority X'FE' to 0, and then resets the DESTINATION flag bit in the data block 64 from 1 to 0 and resets the priority X'FE' to 0. At this time, the data in the data block 64 has been updated with the new image written from the data block 65. The data block 64 is to be written back into the first storage device 37. To indicate this status, the table control device 36 sets the CHANGE flag bit in the control data for the data block 64 to 1. The following Table 3 shows the contents of the table 72 at this time.

TABLE 3

| | Table 72 | | | | | | | | | |
|---|---|---|---|---|---|---|---|---|---|---|
| | [Source Control Data] | | | | | [Destination Control Data] | | | | [Corresponding |
| [Entry] | F | D | S | C | XXXXXXXX | F | S | D | C | XXXXXXXX | Data Block] |
| #0 | 0 | 1 | 0 | 0 | X' 00' | 0 | 0 | 1 | 0 | X' FC' | 69 |
| #1 | 0 | 0 | 0 | 1 | X' 00' | 0 | 0 | 0 | 1 | X' 00' | 60 |
| #2 | 0 | 0 | 0 | 0 | X' 00' | 0 | 0 | 0 | 0 | X' 00' | 65 |
| #3 | 0 | 0 | 0 | 1 | X' 00' | 0 | 0 | 0 | 1 | X' 00' | 64 |

By the COPY processing operations from the requesting of the real addresses to the writing of the image data, new data has been written from the source area into the portion of the destination area in the data block 60. The data block 60 is to be written back into the first storage device 37 from the second storage device 38. To indicate the status, the table control device 36 sets the CHANGE flag bit to 1 in each of the source control data and the destination control data in the entry #1 of the table 72. When the data block 60 has been written back into the first storage device 37, the CHANGE flag bit is reset to 0.

The following Table 2 shows the control data in the entries #0 and #1 of the table 72 at this time.

TABLE 2

| | Table 72 | | | | | | | | |
|---|---|---|---|---|---|---|---|---|---|
| | [Source Control Data] | | | | | [Destination Control Data] | | | |
| [Entry] | F | D | S | C | XXXXXXXX | F | S | D | C | XXXXXXXX |
| #0 | 0 | 1 | 0 | 0 | X' 00' | 0 | 0 | 1 | 0 | X' FC' |
| #1 | 0 | 0 | 0 | 1 | X' 00' | 0 | 0 | 0 | 1 | X' 00' |

At this time, the portion of the source area in the data block 69 in the second storage device 38 (FIG. 5) has been copied into the portion of the destination area in the data block 60. In the same way, the executing device 32 processes the data blocks 65 and 64. Namely, the executing device 32 selects the data block 65 as a data In the above Table 3, the [Corresponding Data Block] is shown in the rightmost column. This is shown only to facilitate the explanation of the present invention and the table 72 does not always include them.

Next, the executing device 32 selects the data blocks 61 and 62 out of the data blocks remaining in the first storage device 37 to be transferred into the second storage device 38.

However, as shown in the following Table 4, the storage blocks #0-#3 in the second storage device 38 have already been stored with the data blocks 69, 60, 65, and 64, and the entries #0-#3 of the table 72 have already been stored with the control data for the data blocks 69-64. Two storage blocks into which the data blocks 61 and 62 are to be stored should be selected.

TABLE 4

| Second Storage Means 38 | |
| --- | --- |
| Storage Block | Storage Contents |
| #0 | Data Block 69 |
| #1 | Data Block 60 |
| #2 | Data Block 65 |
| #3 | Data Block 64 |

First, a storage block, into which the data block 61 including a portion of the source area is to be stored, will be selected. To the end, the table control device 36 checks the source control data, consisting of 12 bits, in each of the entries of the table 72 (Table 3), finds the control data of the lowest value indicated by the 12 bits, and selects the storage block in the second storage device 38 storing the data block corresponding to the control data. Since the control word for the data block 65 (the entry #2 of the table 72) is of the lowest value, the storage block #2 is selected and the data block 61 is stored therein, and the control data for the data block 61 (Table 1) is stored from the table 71 into the entry #2 of the table 72.

The following Table 5 shows the contents of the table 72 at this time.

TABLE 5

| | Table 72 | | | | | | | | | |
| --- | --- | --- | --- | --- | --- | --- | --- | --- | --- | --- |
| | [Source Control Data] | | | | | [Destination Control Data] | | | | [Corresponding |
| [Entry] | F | D | S | C | XXXXXXXX | F | S | D | C | XXXXXXXX | Data Block] |
| #0 | 0 | 1 | 0 | 0 | X' 00' | 0 | 0 | 1 | 0 | X' FC' | 69 |
| #1 | 0 | 0 | 0 | 1 | X' 00' | 0 | 0 | 0 | 1 | X' 00' | 60 |
| #2 | 0 | 0 | 1 | 0 | X' FD' | 0 | 1 | 0 | 0 | X' 00' | 61 |
| #3 | 0 | 0 | 0 | 1 | X' 00' | 0 | 0 | 0 | 1 | X' 00' | 64 |

Next, a storage block, into which the data block 62 including a portion of the destination area is to be stored, will be selected. To the end, the table control device 36 checks the destination control data, consisting of 12 bits, in each of the entries of the table 72 (Table 5), and finds the control data of the lowest value indicated by the 12 bits. As the results, it is found that only the CHANGE flag bit is 1 in the control data for the data blocks 60 and 64. Therefore, the storage block #1 storing the data block 60 is selected.

However, since the CHANGE flag bit in the control data is 1, namely the contents of the data block 60 have been changed and the data block 60 is required to be written back into the first storage device 37, the data block 60 in the storage block #1 in the second storage device 38 is written back into the first storage device 37 and the CHANGE flag bit is reset to 0.

Thereafter, the storage control device 39 stores the data block 62 into the storage block #1 in the second storage device 38 and the control data (Table 1) is fetched into the entry #1 of the table 72.

In the second storage device 38, the portion of the source area in the data block 61 in the storage block #2 is copied into the portion of the destination area in the data block 62 in the storage block #1. The table control device 36 resets the SOURCE flag bit in the control data for the data block 61 from 1 to 0 and resets the priority X'FD' to 0, and then resets the DESTINATION flag bit in the control data for the data block 62 from 1 to 0 and resets the priority X'FD' to 0, and further resets the CHANGE flag bit to 1. The contents of the table 72 and the second storage device 38 at this time are shown in the following Tables 6 and 7.

TABLE 6

| | Table 72 | | | | | | | | | |
| --- | --- | --- | --- | --- | --- | --- | --- | --- | --- | --- |
| | [Source Control Data] | | | | | [Destination Control Data] | | | | [Corresponding |
| [Entry] | F | D | S | C | XXXXXXXX | F | S | D | C | XXXXXXXX | Data Block] |
| #0 | 0 | 1 | 0 | 0 | X' 00' | 0 | 0 | 1 | 0 | X' FC' | 69 |
| #1 | 0 | 0 | 0 | 1 | X' 00' | 0 | 0 | 0 | 1 | X' 00' | 60 |
| #2 | 0 | 0 | 0 | 0 | X' 00' | 0 | 0 | 0 | 0 | X' 00' | 61 |
| #3 | 0 | 0 | 0 | 1 | X' 00' | 0 | 0 | 0 | 1 | X' 00' | 64 |

TABLE 7

| Second Storage Means 38 | |
| --- | --- |
| Storage Block | Storage Contents |
| #0 | Data Block 69 |
| #1 | Data Block 62 |
| #2 | Data Block 61 |
| #3 | Data Block 64 |

Next, a storage block, into which the data block 63 is to be stored, will be selected. To the end, the table control device 36 checks the source control data, consisting of 12 bits, in each of the entries #0–#3 of the table 72 (Table 6) and finds the control data of the lowest value. In this case, the value of the control data in the entry #2 is 0, and therefore, the device 39 stores the data block 63 from the first storage device 37 into the storage block #2 of the second storage device 38, and the control data therefor (Table 1) is fetched into the entry #2 of the table 72.

To explain next as to the data block 69, the data block 69 need not be fetched from the first storage device 37, since it has already been stored into the storage block #0 in the second storage device 38 (Table 7).

The image of the portion of the source area in the data block 63 in the storage block #2 is copied into the portion of the destination area in the data block 69 in the storage block #0, one data line at a time, by the COPY processing algorithm. When the copying has been finished, the table control device 36 resets the SOURCE flag bit in the control data for the data block in the entry #2 of the table 72 from 1 to 0 and resets the priority X'FC' to 0. Then, the table control device 36 resets the DESTINATION flag bit in the control data for the data block 69 (the entry #0 of the table 72) from 1 to 0 and resets the priority X'FC' to 0, and further sets the CHANGE flag bit to 1.

The contents of the table 72 and the second storage device 38 at this time are shown in the following Tables 8 and 9.

TABLE 8

| | | | | | Table 72 | | | | | |
|---|---|---|---|---|---|---|---|---|---|---|
| | [Source Control Data] | | | | | [Destination Control Data] | | | | [Corresponding |
| [Entry] | F | D | S | C | XXXXXXXX | F | S | D | C | XXXXXXXX | Data Block] |
| #0 | 0 | 0 | 0 | 1 | X' 00' | 0 | 0 | 0 | 1 | X' 00' | 69 |
| #1 | 0 | 0 | 0 | 1 | X' 00' | 0 | 0 | 0 | 1 | X' 00' | 62 |
| #2 | 0 | 0 | 0 | 0 | X' 00' | 0 | 0 | 0 | 0 | X' 00' | 63 |
| #3 | 0 | 0 | 0 | 1 | x' 00' | 0 | 0 | 0 | 1 | x' 00' | 64 |

TABLE 9

| Second Storage Means 38 | |
|---|---|
| Storage Block | Storage Contents |
| #0 | Data Block 69 |
| #1 | Data Block 62 |
| #2 | Data Block 63 |
| #3 | Data Block 64 |

As stated above, it is clear that all the image in the source area 51 shown in FIG. 5 has been copied into the destination area 52. However, at this time, as indicated by "1" in the CHANGE flag bit in Table 8, the updated data blocks 69, 62, and 64 exist in the storage blocks #0, #1, and #3, respectively, and they may be written back into the first storage device 37. The storage control device 39 writes back these data blocks into the first storage device 37 and the table control device 36 resets their CHANGE flag bits to 0. Finally, the table control device 36 resets all the control data in the tables 71 and 72 and completes the COPY processing operations.

As seen from the above explanation, the COPY processing, wherein the source area 51 is copied into the destination area 52 in the virtual image 50 shown in FIG. 5, has been performed by fetching the predetermined data blocks from the first storage device 37 into the second storage device 38 with the lowest frequency of fetching. In the above explanation of the COPY processing, it has been assumed that all of the storage blocks of the second working storage device 38 have been cleared at the beginning, some data blocks may exist in the second storage device 38 at that time. In that case, the control data for these data blocks will be set first in the table 72 before the operations as explained above are performed. Further, although the above explanation has been made assuming that the size of the portion of the source area in a data block associated with the source area and the size of the portion of the destination area in another data block associated with the destination area are equal, these sizes may be different from each other. In that case, by the request for the reference points for such portions of different sizes, it will be found that another data block different from the currently used data block is required. At that time, the control data for the currently used data block will be updated and such a different data block will be fetched into the second storage device 38 (in case such a different data block does not exist in the second storage device 38).

While the present invention has been described with respect to an embodiment in connection with the COPY processing, it is to be understood that the present invention may be applied to the image processing in general including the MOVE, ERASE, ROTATE and other processing without being limited thereto.

What is claimed is:

1. An image processing method wherein data representing an image is stored on a block basis as data blocks in a first storage means, having a plurality of storage blocks, and the data blocks to be processed are fetched from said first storage means into a second working storage means, having a smaller number of storage blocks than said plurality of storage blocks in said first storage means, to perform image processing, comprising the steps of:
    (a) specifying the position of a specified area in said image, a contents of the image processing to be performed on said specified area, and the position of a destination area in said image which is a destination of said specified area for said image processing;
    (b) finding said data blocks associated with said specified area and said destination area and determining, in accordance with said contents of said image processing, a first order in which said blocks associated with said specified area are used in said image processing and a second order in which said data blocks associated with said destination area are used in said image processing;
    (c) setting first control data including data representing the association with said specified area and data representing said first order, and second control data including data representing the association with said destination area and data representing said second order, respectively, in those entries in a table means which correspond to the storage blocks in said first storage means or said second storage means storing said data blocks associated with said specified area and said destination areas, said table means having entries each corresponding to each of said storage blocks in said first storage means and said second storage means;
    (d) preparing in said second storage means said data blocks associated with said specified area and said destination area, whereas the necessity in said second storage means of said data stored in each of said storage blocks in said second storage means is checked based on said entries in said table means each corresponding to each of said storage blocks in said second storage means;
    (e) performing said image processing by using said data blocks preparing in said second storage means;
    (f) updating said first control data and said second control data for said data blocks used in performing said image processing; and
    (g) repeating said steps (d) through (f) until said image processing is completed.

2. The image processing method according to claim 1 wherein said step of preparing data blocks associated with said specified area and destination area in said second storage means, comprises:
    checking whether or not a data block to be used exists in said second storage means and if not, finding a storage block which has the lowest of said necessity; and
    fetching said data block to be used from said first storage means into said storage block of said lowest necessity, and tat the same time writing control data for said data block to be used into the entry in said table means corresponding to said storage block of said lowest necessity.

3. The image processing method in accordance with claim 2 wherein the step of finding said storage block of said lowest of said necessity comprises:

finding said storage block of said lowest of said necessity in association with said specified area when said data block is to be used in association with said specified area; and finding said storage block of said lowest of said necessity in association with said destination area when said data block is to be used in association with said destination area.

4. The image processing method in accordance with claim 2 wherein said step of fetching said data block to be used from said first storage means into said storage block of said lowest of said necessity comprises:

fetching said data block to be used from said first storage means into said storage block of said lowest of said necessity after writing the data block existing in said storage block of said lowest necessity of said back into said first storage means when said data block existing in said storage block of said lowest of said necessity has been changed.

5. The image processing method in accordance with claim 1, wherein said step of updating said first control data and said second control data for said data blocks used in performing said image processing comprises:

updating said first control data and said second control data in association with said specified area when said data blocks have been used in association with said specified area in said image processing, and updating said first control data and said second control data in association with said destination area when said data blocks have been used in association with said destination area in said image processing.

6. An image processing system comprising:

first storage means, having a plurality of storage blocks, for storing data representing an image on a block basis as data blocks into said storage blocks;

second working storage means, having a smaller number of storage blocks than said plurality of storage blocks in said first storage means, for storing said data blocks to be processed into said storage blocks;

specifying means for specifying position data representing a position of a specified area in said image, a contents of said image processing to be performed on said specified area, and the position of a destination area in said image which is a destination of said specified area in said image processing;

determining means for finding said the data blocks associated with said specified area and said destination area and determines orders in which said data blocks are used in said image processing, in accordance with said contents of said image processing to be performed on said specified area contents specified by said specifying means;

a table means having entries each corresponding to each of said storage blocks in said first storage means and said second storage means;

a table control means, connected between said determining means and said table means, which sets control data in the entries in said table means, updates the control data in the entries in said table means each corresponding to each of said storage blocks in said second storage means, and checks the contents of said entries each corresponding to each of said storage blocks in said second storage means; and a storage control means for receiving outputs of said table control means and for controlling said first storage means and said second storage means.

7. The image processing system in accordance with claim 6, wherein said table control means comprises:

reference data generating means for generating data concerning associated data blocks from said position data of reference points in said image; and pointer means which receives outputs of said reference data generating means and indicates the data blocks to be referenced.

8. The image processing system in accordance with claim 7 wherein said pointer means comprises:

current reference pointer for indicating data blocks referenced currently;

previous reference pointer for indicating the data blocks referenced previously; and comparator for comparing contents of said current reference pointer and those of said previous reference pointer.

9. The image processing system in accordance with claim 6, wherein said storage control means controls writing and reading of data into and out of said first storage means and said second storage means on a block basis, and receives the outputs of said table control means to cause said data blocks to be written from said first storage means into said second storage means.

10. The image processing system in accordance with claim 6 wherein said storage control means generates real addresses of said data representing an image in said first storage means and said data blocks to be processed into said storage blocks in said second storage means.

11. The image processing system in accordance with claim 9 wherein said storage control means generates real addresses of said data representing said image in said first storage means and said data blocks to be processed into said storage blocks in said second storage means.

* * * * *